(No Model.)

G. A. WELLES, Jr.
DYNAMO ELECTRIC MACHINE AND ELECTRIC MOTOR.

No. 555,544. Patented Mar. 3, 1896.

WITNESSES:
Edward C. Rowland.
M. Turner

INVENTOR
George A. Welles, Jr.
BY
Price Stuart
ATTORNEYS

UNITED STATES PATENT OFFICE.

GEORGE A. WELLES, JR., OF NEW YORK, N. Y., ASSIGNOR TO THE C. & C. ELECTRIC COMPANY, OF NEW JERSEY.

DYNAMO-ELECTRIC MACHINE AND ELECTRIC MOTOR.

SPECIFICATION forming part of Letters Patent No. 555,544, dated March 3, 1896.

Application filed April 12, 1895. Serial No. 545,438. (No model.)

*To all whom it may concern:*

Be it known that I, GEORGE A. WELLES, Jr., of the city, county, and State of New York, have invented a new and useful Improvement in Dynamos and Motors, of which the following is a full description.

Figure 1:
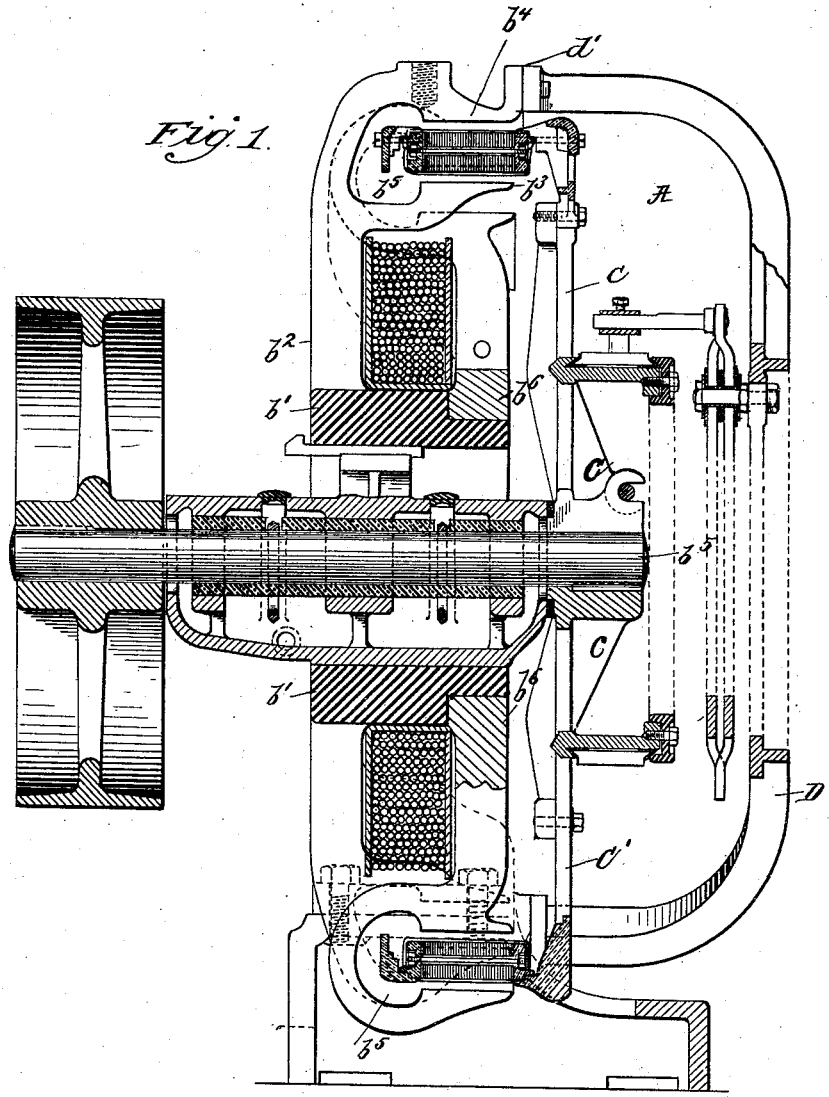
Figure 2:
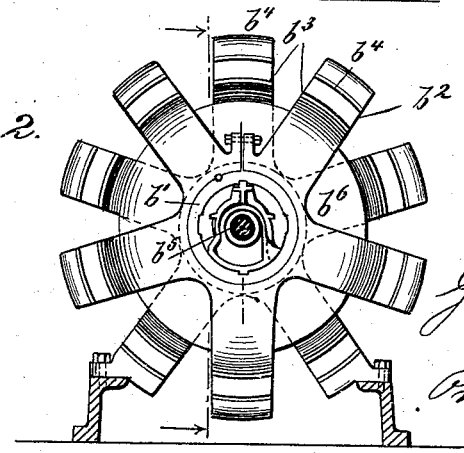

Figure 1 is a vertical view of the apparatus, partly in section. Fig. 2 is a front view of the device with the armature removed.

A is a multipolar electromagnet constructed substantially as follows: A core $b'$ is provided with a set of radial arms $b^2$. At the outer ends of these arms pole-pieces are formed, as shown in the drawings, with U-shaped projections to embrace an armature and project about the same on the outside and inside thereof. As thus formed, these pole-pieces present two faces $b^3$ $b^4$ in concentric planes with the axes of the machine—one outside and the other inside of the armature, more fully described hereinafter—and concentrate the magnetic flux for action upon said armature. Behind these faces the metal is cut away, as shown at $b^5$, to prevent an excessive magnet-flux, and to obtain good mechanical clearances at other points than the faces. $b^6$, is a ring provided with radial arms similar to those already described and having its pole-pieces similarly formed. The ring is slipped over the core $b'$ and properly secured thereto, and the radial arms of this ring alternate with the arms above described, and together they constitute the frame of a multipolar electromagnet whose pole-pieces are in concentric plane with the axis of the machine. On the core $b'$, between the two sets of arms terminating in the poles of opposite polarity, the bobbin of the magnet is placed. A shaft $b^5$, which carries the armature of the device, projects through an opening in the core of the magnet, and within the opening the journal of this shaft is supported. This armature complete is composed of a spider C, having radial arms $c'$ to support and carry an armature which projects therefrom and enters the U-shaped ends of the magnet pole-pieces between the faces $b^3$ $b^4$. The winding of this armature may be as shown or of any of the other well-known methods. It will thus be seen that by such construction I make available the maximum of the winding of the armature and expose the same to the magnetic flux from each pole-piece of the magnet inside and outside, and one of its effects when in action is to attain on both sides of the projecting armature and opposite to each other magnetic poles of the same sign.

Viewing Fig. 1, D is a supporting-spider for the brushes of the dynamo. It is attached to several pole-pieces of the magnet of similar sign, as shown at $d'$.

What I claim, and desire to secure by Letters Patent, is—

1. In a dynamo or motor a single-coil multipolar magnet, provided with arms radiating from the core at either side of its coil, and terminating with U-shaped pole-pieces alternating in sign and lying in a plane concentric with the axis of the machine, to thereby co-operate with an armature constructed to register therewith and be embraced between the opposite faces of the U-shaped pole-pieces.

2. In a dynamo or motor a single-coil magnet provided with arms radiating from its core at either side of its coil and formed with U-shaped projecting ends in circular line with each other in combination with a shaft passing through the core of the magnet and journaled therein and an armature carried by said shaft projecting into the U-shaped ends of the pole-pieces and thereby embraced outside and inside.

3. In a dynamo or motor a multipolar electromagnet provided with alternating pole-pieces U-shaped in form to thereby embrace inside and outside an armature constructed to register therewith, in combination with a supporting-spider for the commutator-brushes secured to the outer ends of the U-shaped pole-pieces of similar sign.

Signed at Garwood, in the county of Union and State of New Jersey, this 11th day of April, A. D. 1895.

GEORGE A. WELLES, JR.

Witnesses:
DAVID W. BARNES,
JÖN. SIMON, Jr.